(12) United States Patent
Singer et al.

(10) Patent No.: US 6,324,833 B1
(45) Date of Patent: Dec. 4, 2001

(54) REINFORCED COMPOSITE ARTICLES AND METHOD OF MAKING SAME

(75) Inventors: Victor Singer; Frederick W. VanName, both of Newark, DE (US); James A. Hartwell, Elkton, MD (US)

(73) Assignee: Cordant Technologies, Inc., Salt Lake City, UT (US)

( * ) Notice: Subject to any disclaimer, the term of this patent is extended or adjusted under 35 U.S.C. 154(b) by 0 days.

(21) Appl. No.: 07/513,925

(22) Filed: Apr. 24, 1990

(51) Int. Cl.$^7$ ........................................................ F02K 1/00
(52) U.S. Cl. .............................. 60/271; 138/44; 138/132; 138/172; 239/265.11; 239/DIG. 19; 428/36.9
(58) Field of Search .................................. 102/374; 60/271; 220/588, 589, 590; 428/36.9, 36.3, 36.4; 138/44, 45, 132, 133, 134, 172, 174; 239/265.11, 265.15, DIG. 19

(56) References Cited

U.S. PATENT DOCUMENTS

| | | | |
|---|---|---|---|
| 3,534,908 | * 10/1970 | Coleman et al. | ............ 60/271 X |
| 4,063,684 | * 12/1977 | O'Brien et al. | ................ 239/265.11 |
| 4,477,024 | * 10/1984 | O'Driscoll et al. | ............. 239/265.11 |
| 4,519,290 | 5/1985 | Inman et al. | .............................. 87/7 |
| 4,807,531 | * 2/1989 | Reynolds et al. | ............... 239/265.15 |
| 4,852,347 | * 8/1989 | Reynolds et al. | ............... 239/265.11 |
| 4,892,764 | 1/1990 | Drain et al. | ........................ 428/34.5 |

FOREIGN PATENT DOCUMENTS

1330465 * 9/1973 (GB) .................................. 428/36.3

* cited by examiner

*Primary Examiner*—Harold J. Tudor
(74) *Attorney, Agent, or Firm*—Sullivan Law Group

(57) ABSTRACT

A composite tubular article such as a nozzle or a polar boss for a rocket motor wherein straight matrix impregnated yarn portions extend from one end portion to the other in a non-cylindrical ply to achieve increased strength while affording lighter weight. The matrix material may be at least partially curable by actinic radiation to anchor the yarn portions in position as they are applied on a mandrel so that radial rods or the like for anchoring the yarn may be eliminated. For high performance rocket motor nozzle components and the like, the yarn portions may be straight or non-straight and applied by braiding or the like, and the matrix material may be decomposed to a char adequate to anchor the yarn portions and subjected to one or more densification cycles whereby the matrix material may be carbonized.

16 Claims, 3 Drawing Sheets

REINFORCED COMPOSITE ARTICLES AND METHOD OF MAKING SAME

The present invention relates generally to composite articles such as nozzles and polar bosses for rocket motors which are reinforced by yarns of fibrous material impregnated with a matrix material.

A rocket motor nozzle usually consists of one or more bodies of revolution which may be generally described as having a non-cylindrical tubular shape which converges from a large diameter entrance to a reduced diameter throat and then diverges to a large diameter exit end. Because of the high exposure temperature during rocket motor operation, nozzle components are frequently constructed from allotropes of carbon or other materials appropriately resistant to such environments. Composite materials have also been used in which two or more fractions are combined to produce attributes not attainable otherwise.

One such composite material type, known as carbon-carbon, is constructed from a reinforcement fraction consisting of carbon or graphite yarns or rods and a matrix fraction which fills interior space not occupied by reinforcement. Construction of such a composite is performed in sequential steps, the first consisting of creating the desired yarn architecture, and subsequent steps consisting of creating the matrix from liquids such as pitch or various resins or from gases such as methane, or from a combination of liquid and gaseous approaches. Composites of the same type may also be constructed using silicon carbide, hafnium carbide, or other high temperature resistant materials in either the reinforcement or matrix fractions or both, using analogous approaches.

An example of such a composite material is disclosed in U.S. Pat. No. 4,519,290 to Inman et al, which patent is assigned to the assignee of the present invention and which patent is hereby incorporated herein by reference. Inman et al describes a nozzle component consisting of a triaxial braid of carbon fibers built up on a mandrel which supports a plurality of carbon rods positioned in rows and extending radially from the mandrel surface over generally the depth of the composite material of the article to be formed. The radial rods anchor the yarns of the triaxial braid in place as the material is being laid onto the mandrel. Inman et al further describes a process of constructing the matrix fraction of the composite using pitch, consisting of repeated exposures to high temperature, which process may be called "densification" because each cycle increases the density of the composite.

Another example of a carbon-carbon composite is one which has a three dimensional yarn architecture which uses yarns in the radial, circumferential, and axial or meridional directions of the component. For such a three dimensional yarn architecture, the anchoring function of the radial yarns protruding from the mandrel is much more important than in the four dimensional braided construction of Inman et al wherein the braided preform may be sufficiently stable if the component thickness is small.

While such a process as described in Inman et al is considered generally satisfactory, the radial rods in either the three dimensional or four dimensional architecture do not serve a substantial useful function in the completed article and also undesirably act as constraints on yarn architecture. These radial rods also generally erode faster than other yarns leading to increased erosion of nozzle throat inserts. Reduction of such throat erosion may advantageously allow the nozzle expansion ratio, the ratio of areas at the nozzle exit and nozzle throat, to be better maintained, with no change in specific gravity, for better motor performance. These radial rods may also disadvantageously result in increased article thickness and weight for the same amount of yarn in the principal directions of the component membrane. Thus, both increased yarn fraction and increased erosion resistance may be advantageously obtained by eliminating the radial rods. However, if such radial rods are eliminated, it may be necessary to provide an alternative means of holding the yarns in place during the lay-up process.

When the nozzle throat component uses curved meridional yarns, whether with three-dimensional or four-dimensional yarn architectures, operational problems early during burn of the rocket motor may occur while the inner surface, exposed to the exhaust gases, is substantially hotter than regions of the cross-section farther from the heat source. Thermal expansion of the innermost meridional yarns, which because of their curvature tend to displace inward from the rest of the component cross-section, must be restrained by radial tension in the matrix fraction of the composite in order for the component to remain intact. The radial yarns are of little help in this regard because of their insufficient embedment in near-inner-surface material at high temperature to receive any substantial load. Tensile fracture of the matrix fraction, and the resulting buckling of meridional yarns, can produce undesirably high erosion of the throat, spalling, and motor performance losses. It is therefore desirable to eliminate the curvature in such meridional yarns.

A polar boss, which may be used for example to attach and transmit load between the nozzle or an ignition device to the case of a rocket motor or to attach other functional features to a pressure vessel, also may have a non-cylindrical tubular shape which may be described similarly as the nozzle is described. The manufacture of a polar boss would not normally require the densification process typically required for high performance nozzle components, but a polar boss may instead be composed of a cured matrix material impregnating the yarns thereof. The performance of composite polar bosses has been limited by manufacturing processes and non-optimal fiber orientation for sustaining the imposed loads, i.e., curved yarns therein may tend to straighten under load so that the composite may not provide the strength which a metal boss may provide and thus may not be competitive in performance therewith. However, composite polar bosses, if they have adequate strength, may desirably be used in rocket motors and other pressure vessels to reduce the weight thereof.

It is therefore an object of the present invention to permit elimination of unnecessary anchoring yarns or members from a non-cylindrical composite tubular article such as a nozzle, nozzle throat insert, or polar boss so that the resulting article may have more efficient yarn architecture, be lighter, take up less volume, be less expensive, have diminished nozzle erosion, or any desired combination of these features.

It is also an object of the present invention to permit reduction or elimination of curvatures in the load-bearing yarns in the axial direction for increased tensile or compression strength and to reduce radial tension, yarn buckling, and spalling.

In accordance with the present invention, a ply of the article comprises a plurality of straight yarns which extend from one end portion to the other end portion and which are impregnated by a matrix material in which cure may be accomplished or initiated by actinic radiation such as ultraviolet radiation to anchor the yarns in place as they are applied to the mandrel. Plies of circumferential or helical yarns or cloth may be interleaved between plies of straight yarns. If the article is to comprise a carbonizable material impregnating the yarns, the anchoring matrix material is selected to have a sufficiently high char yield to continue to anchor the yarns after it is carbonized or charred and before densification cycles thereof, and the yarns for this purpose need not be straight but may be braided or the like. Other objects, features, and advantages of the present invention will become apparent in the following detailed description of the preferred embodiments thereof which should be read in connection with the accompanying drawings.

DETAILED DESCRIPTION OF THE PREFERRED EMBODIMENTS

Figure 1:
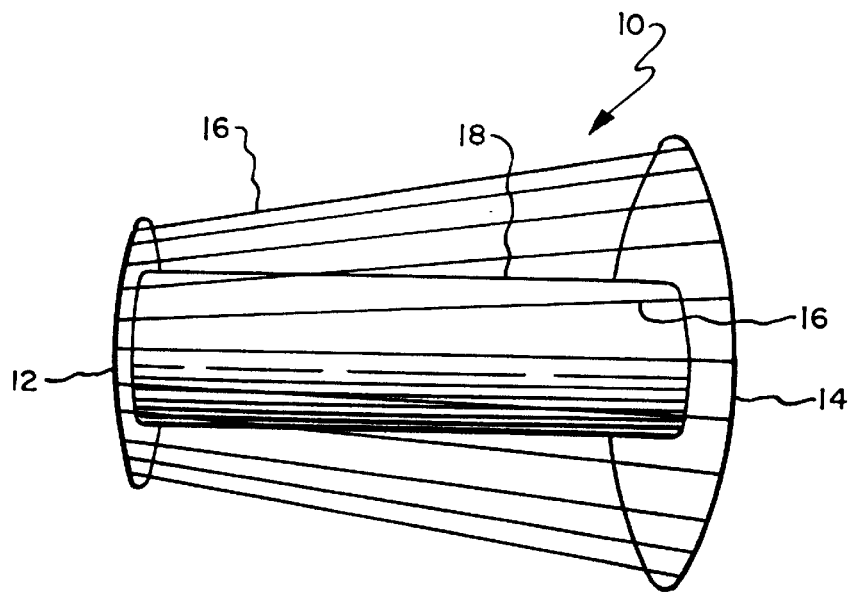
FIGS. 1 and 2 are perspective views which illustrate a concept of yarn architecture which is embodied in the present invention.
Figure 2:
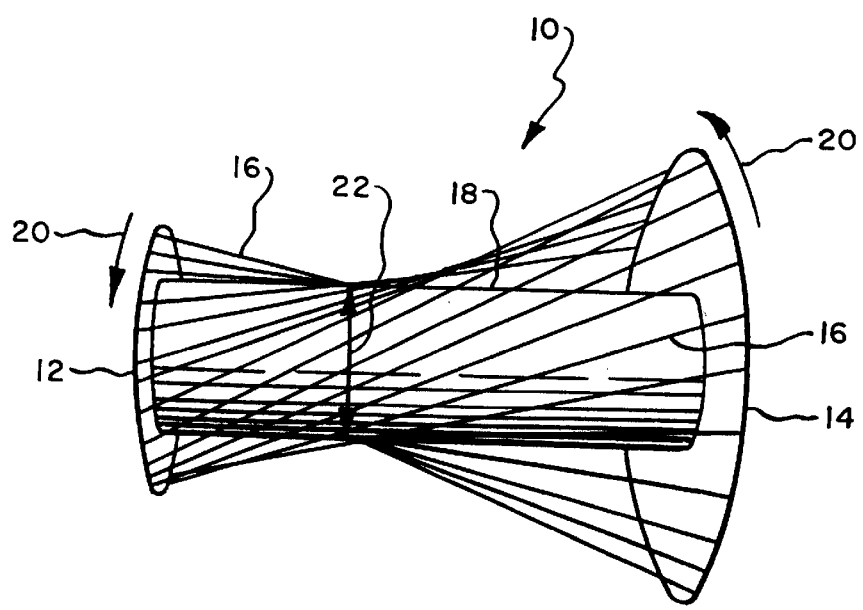

An appreciation of the yarn architecture of the present invention may be achieved by reference to the model of FIGS. 1 and 2. The model includes first and second circular end portions 12 and 14 respectively, in which end portion 12 may have a smaller diameter than end portion 14. However, end portion 12 may have the same diameter as end portion 14. End portion 12 may represent, for example, a point of attachment of a nozzle to a rocket motor, and end portion 14 may represent the exhaust end of the nozzle. A plurality of yarns 16 extend from the periphery of the end portion 12 to the periphery of the end portion 14. When the circumference of the end portion 12 is less than that of end portion 14, the spacing between individual yarns 16 will vary over the length thereof from a minimum at end portion 12 to a maximum at end portion 14. Because of the changing spacing between yarns 16, the thickness of the component may be larger at the throat region 22 of the component than at the ends 12 and 14. Cylindrical member 18, which also extends between the end portions 12 and 14 and coaxial therewith, has a diameter which represents the smallest inside diameter of an article to be built, i.e., the throat diameter of a nozzle, for example.

Referring to FIG. 2, the end portions 12 and 14 are twisted relative to each other, as illustrated by arrows 20, until the yarns 16 touch the cylindrical member 18 to thus achieve the configuration shown in FIG. 2 wherein the ply of yarns 16 at one end has the diameter of end portion 12, has the diameter of end portion 14 at the other end, and at a point intermediate the end portions has a diameter 22 equal to the diameter of the cylindrical member 18. As can be seen in FIG. 2, the resulting yarn architecture form is that of, for example, a converging-diverging nozzle used in rocket motors wherein the throat of the nozzle is illustrated by ply diameter 22. The yarn architecture may be said to be in the form of a hyperbolic paraboloid structure which diverges in both directions from the throat or smallest diameter section 22. It should be noted that the architectural shape obtained in FIG. 2 is achieved by the use of straight yarns which are skewed to an axial plane of the model, i.e., a plane which contains the axis. It should also be noted that the twisting illustrated by arrows 20 in FIG. 2 is intended to convey an understanding of the yarn architecture in a single ply of the construction rather than the techniques by which the construction is accomplished, which are described hereinafter.

Figure 3:
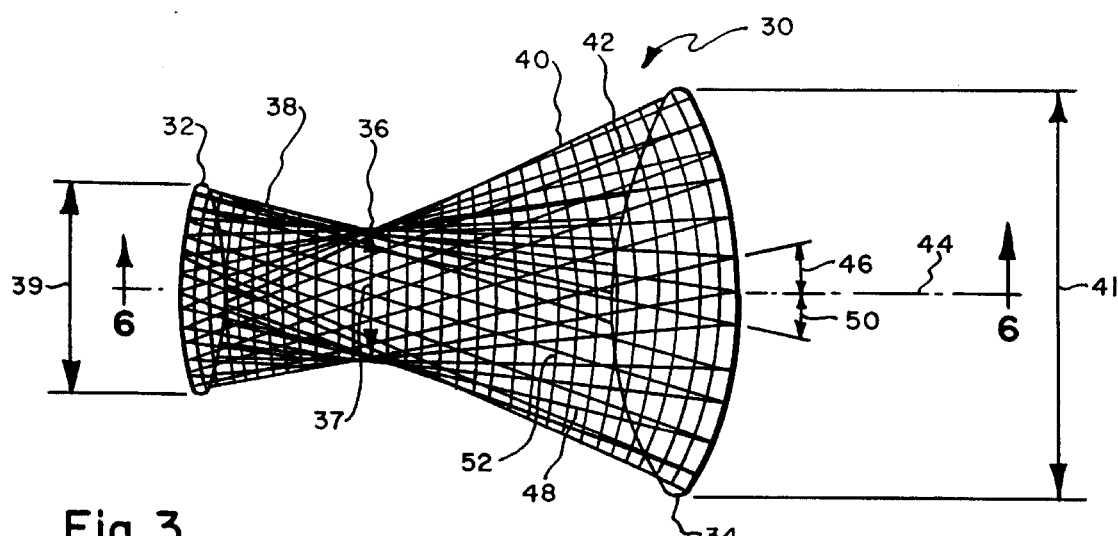
FIG. 3 is a schematic side view of a nozzle which embodies the present invention and which illustrates the yarn architecture therein.
Figure 6:
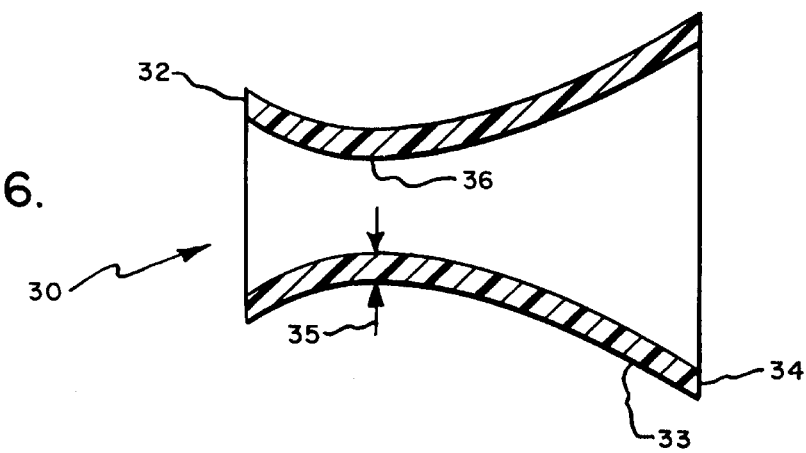
FIG. 6 is a sectional view of the nozzle of FIG. 3 taken along lines 6—6 thereof.

Referring to FIGS. 3 and 6, there is shown a nozzle 30 which has a yarn architecture similar to that obtained in FIG. 2. The nozzle component 30 comprises a non-cylindrical thickness of composite material, illustrated at 35 in FIG. 6, which is tubular and has a first end portion 32 for attachment to a rocket motor case and a second end portion 34 representing the exhaust outlet from the nozzle. As used in this specification and the claims, the term "tubular" is meant to refer to a non-cylindrical elongate shape of an article which has a coaxial channel extending therethrough. The nozzle 30 has a throat 36 at which the inside diameter for passage of combustion gases is the smallest. The throat or intermediate portion 36 has an outer diameter 37 which is less than either the outer diameter 39 of end portion 32 or the outer diameter 41 of end portion 34. The nozzle 30 has a converging portion 38 extending from the end portion 32 to throat 36 and a diverging portion 40 extending from throat 36 to the end portion 34. Typical of rocket motor nozzles, the end portion 32 may have, but is not necessarily required to have, a diameter which is less than that of end portion 34. The nozzle 30 is composed of a plurality of plies of yarn of fibrous material impregnated with a matrix material, as will be described in greater detail hereinafter, laid one over the other on a mandrel, illustrated at 70 in FIG. 5, until the desired thickness of the composite is obtained. A first ply may be similar to the ply of yarns 16 in FIG. 2 and may comprise a plurality of straight yarn portions 42 each of which extends from end portion 32 to end portion 34 and each of which is skewed relative to axial plane 44 at an angle illustrated at 46. Thus, the local radius to the ply increases from the radius at an intermediate portion to larger radii at the end portions thereof. A second ply of straight yarn portions 48 is similar to the first ply of yarn portions 42 but each yarn portion 48 is skewed relative to axial plane 44 at an opposed angle, illustrated at 50, i.e., for example, if angle 46 is +20° relative to axial plane 44, then angle 50 may be −20° relative to axial plane 44. In order to maximize the strength of the nozzle 30 in the axial direction and achieve uniformity, it is preferred that the plies 42 and 48 alternate throughout the thickness of the nozzle.

It should be noted that the spacing between yarn portions at the larger diameter end portion 34 is greater than the spacing at the smaller diameter end portion 32 due to the increased circumference of the larger end portion 34 and therefore the increased circumference of each of the plies 42 and 48 at the end portion 34. In order to provide strength to the nozzle 30 in the circumferential direction as well as to fill in the space between the yarn portions 42 and 48 especially in the area close to the end portion 34 as well as to aid in ensuring straightness of the yarn portions in succeeding plies 42 or 48, a ply of yarn portions 52 may preferably be provided to extend circumferentially of the nozzle, for example, ply 52 may comprise hoop or helical windings. While the particular order of windings and the particular type of winding for ply 52 may depend on the particular characteristics of the nozzle or other article to be built and may be determined in accordance with principles commonly known to those of ordinary skill in the art to which this invention pertains, the windings may perhaps be put in the order of a ply 52 alternating with each pair of plies 42 and 48.

The yarn portions for the nozzle 30 may be made of any suitable material. For example, for a high performance rocket motor nozzle, the yarn portions may be composed of carbon or silicon carbide fibers.

The angles of the yarn portions for a specific article shape may be determined by building a model such as illustrated in FIGS. 1 and 2 and taking the angles therefrom. Alternatively, the angles may be determined mathematically in accordance with principles known to those of ordinary skill in the art to which this invention pertains. The yarns may be laid from one end portion 32 to the other end portion 34 and over pins or grooves (not shown) or the like and returned to the first end portion 32 in accordance with a filament winding process commonly known to those of ordinary skill in the art to which this invention pertains, or they may be hand laid up.

In order to anchor the yarn portions 42 and 48 in position so that they remain straight and so that their positions are undisturbed when subsequent plies are overlaid, in accordance with the present invention the yarn portions are impregnated with a matrix material in which cure is accomplished or initiated by an actinic radiation, such as, for example, ultraviolet radiation. By "actinic radiation" is meant, for the purposes of this specification and the claims, electromagnetic radiation having a wave length of about 700 nm or less which is capable, directly or indirectly, of at least partially curing the matrix material. By "indirect curing" in this context is meant curing under such electromagnetic radiation conditions as initiated, promoted, or otherwise mediated by another compound.

Figure 4:
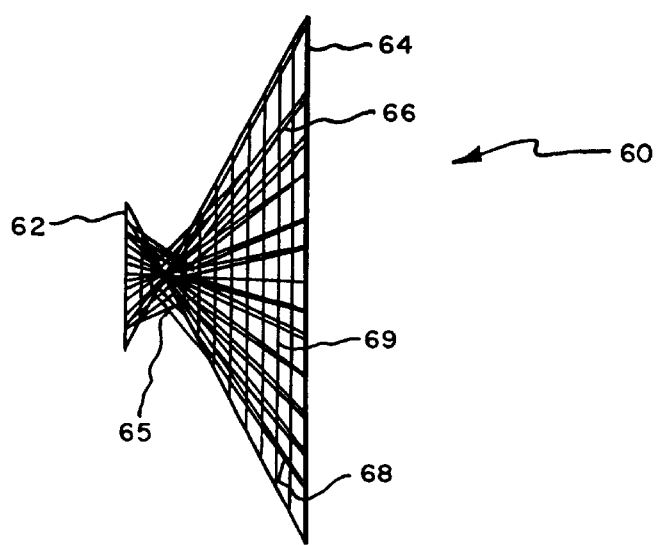
FIG. 4 is a view, similar to that of FIG. 3, of a polar boss which embodies the present invention.

Referring to FIG. 4, there is illustrated a yarn architecture for a rocket motor polar boss 60 which has a tubular shape similar to that of FIGS. 3 and 6 and which provides means for attachment of a rocket motor case or other pressure vessel to other functional devices such as a nozzle or ignition device and transmits the load thereto. The polar boss has end portions 62 and 64 and a reduced diameter intermediate portion 65 and comprises a composite of plies of opposed straight yarn portions 66 and 68 similar to yarn portions 42 and 48 in FIG. 3 and circumferential yarn portions 69 similar to yarn portions 52 in FIG. 3.

Suitable attachment members (not shown) such as titanium foil strips may be interleaved into the lay-up for the polar boss at one or both ends to provide attachment means of the article to a rocket motor or pressure vessel.

For a polar boss 60, the inner plies are preferably composed of high compression strength material such as, for example, a boron/epoxy composite, and the outer plies are preferably composed of a high tension strength material such as, for example, a graphite/epoxy composite.

The use of straight yarn portions 66 and 68 in the polar boss 60 allows it to have a strength competitive with the strength of high strength steel bosses while also allowing the rocket motor or pressure vessel to which it is attached to advantageously be of lighter weight.

After a composite product has been built up similar to those shown in FIGS. 3 and 4, the product may be severed at any point along the axis thereof, such as at intermediate portion 65, by machining or other suitable means to achieve the final article shape desired. Alterations of the geometry of the interior and/or exterior surfaces of the component may be accomplished in similar fashion.

Figure 5:
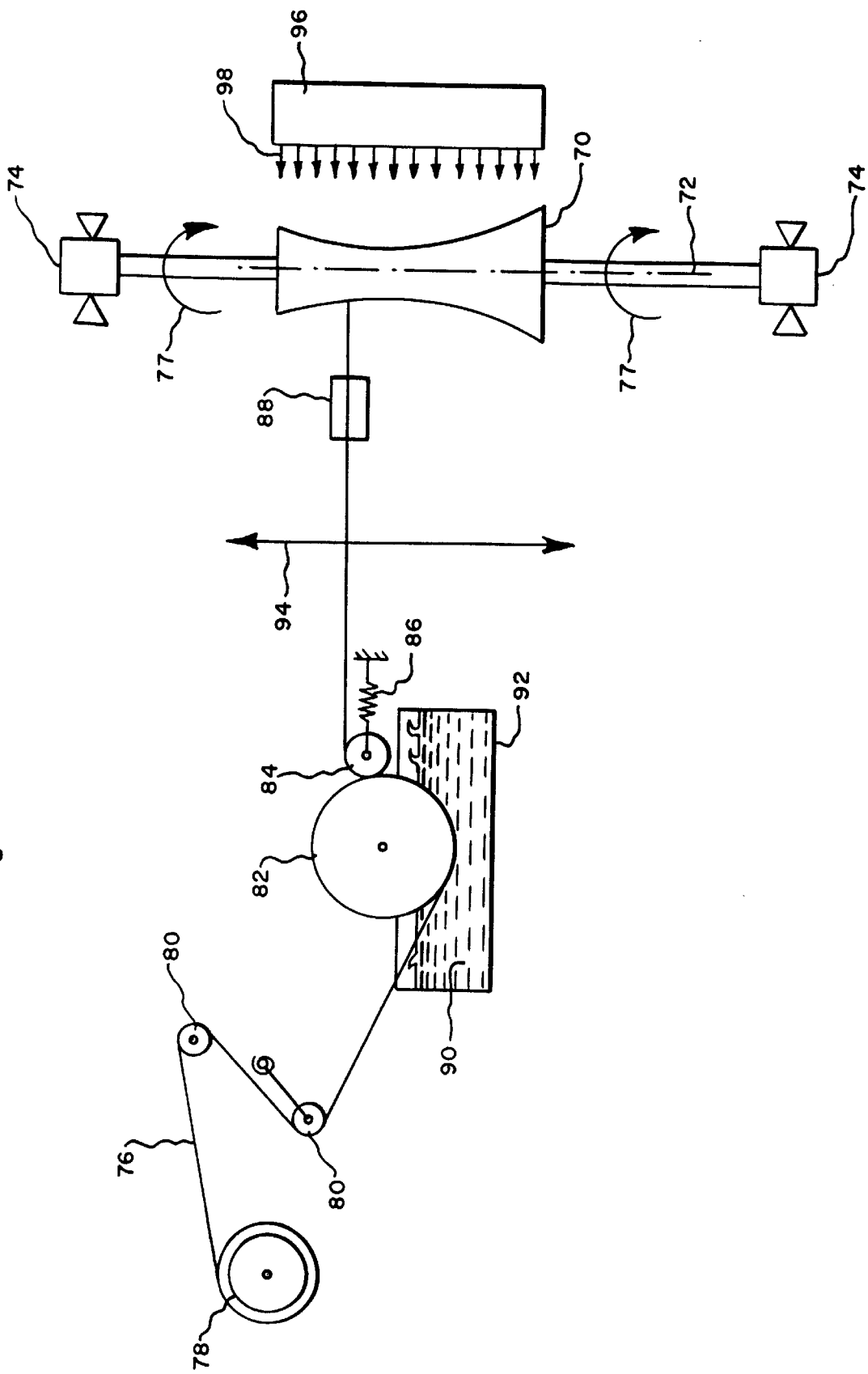
FIG. 5 is a schematic view illustrating a process of making an article according to the present invention.

Referring to FIG. 5, in order to wind a composite article the mandrel illustrated at 70 having the desired shape is suitably set on rotatable shaft or axis 72 which is suitably supported by suitable supports 74 and rotated as indicated by arrows 77. The yarn 76 of fibrous material, which may provide any of the yarn portions 42, 48, 52, 66, 68, or 69 illustrated in FIGS. 3 and 4, is led from a fiber spool 78 through or about suitable conventional tensioning devices 80 to the under portion of a suitable roll 82. The yarn 76 is routed between roll 82 and a smaller roll 84 to which tension is suitably applied as illustrated at 86 to a suitable conventional delivery head 88 from which the yarn 76 is applied onto the mandrel 70 as it rotates. A suitable ultraviolet radiation or otherwise actinic radiation curable matrix material 90 is contained within a container 92 in which the bottom portion of roller 82 submerges as it rotates so that the matrix material 90 is applied to the yarn 76 as it is led along the under surface of the roll 82 and through the matrix bath 90. The delivery head 88 is movable, as illustrated at 94, parallel to the axis 72 for delivery of yarn 76 along the length of the mandrel 70 as it rotates. The speed of rotation of the mandrel 70 and of the delivery of yarn 76 and the speed of translation of delivery head 88 in the directions 94 are regulated in accordance with principles commonly known to one of ordinary skill in the art to which this invention pertains to apply the yarn 76 in accordance with the yarn architecture desired, for example, to apply the yarn as illustrated in FIG. 3. As the yarn 76 is applied to the mandrel 70 it is subjected to radiation, illustrated at 98, from a suitable source 96 of actinic radiation such as ultraviolet radiation to immediately at least partially cure the matrix material 90 or to initiate its cure to anchor the yarn 76 in the desired position. The particular dosage of radiation 98 may be selected in accordance with principles commonly known to those of ordinary skill in the art to which this invention pertains to achieve sufficient and timely curing of the matrix material 90.

The matrix material 90 along with the use of actinic radiation may be used with other suitable winding processes such as braiding to anchor the yarns, which may or may not be straight, in position as they are applied onto a mandrel to thereby reduce the required article thickness such as by eliminating the radial yarns or rods shown in the Inman et al patent. For example, cylindrical billets for nozzle throat inserts may be filament wound with radial yarns omitted and with increases in hoop and axial yarn fractions to fill in the space previously taken up by the radials by anchoring the yarn portions in position as they are applied with the matrix material 90 along with the use of actinic radiation whereby the omission of radial yarns may effect a reduction in the nozzle throat insert erosion rate so that a better nozzle expansion ratio may be maintained, with no change in specific gravity, for increased motor performance.

The matrix material 90 may suitably comprise an actinic radiation curable first resin component and a second resin component which is subsequently cured after actinic radiation exposure curing of the first resin component and thus is non-cured under actinic radiation conditions effective for curing the first resin component, as disclosed in U.S. Pat. No. 4,892,764 to Drain et al which is assigned to Loctite Corporation and which is hereby incorporated herein by reference. As discussed therein, the first resin component may comprise any suitable resin which under actinic radiation conditions may be cured to such extent as to immobilize the resulting partially cured mass of the composition comprising the first and second resin components, i.e., spatially fix the location of the partially cured composition mass so that it does not migrate during the subsequent cure of the second resin component and thereby cause the yarn 76 to be anchored in position. The second resin component may or may not be so curable depending on the cure and resin composition desired. However, if both first and second resins are actinic radiation curable, the second resin component is non-curable under actinic radiation conditions which are effective for curing the first resin component. Accordingly, photoinitiators may be added to the composition in an amount effective to respond to the actinic radiation and to initiate an induced curing of the associated resin via substantial polymerization thereof. The second resin component of the composition may be any suitable resin which is compatible with the composition and which upon cure provides the desired physical and performance characteristics such as strength in the final article. Thus, the second resin component may be curable over a long period of time under ambient temperature or other suitable conditions of cure commonly known in the art. Thus, after the polar boss 60 or nozzle 30 or other suitable article has been laid up on the mandrel 70 and the yarn 76 anchored in position, the article may be removed from the mandrel 70, suitably machined at its ends, and the second resin component cured to achieve the final product.

Carbon black in a suitable quantity may be added to the matrix material 90 to make it opaque so that bubbles may be eliminated from the matrix material.

A high performance rocket motor having a propellant that burns at a high temperature may desirably require a nozzle which is composed of carbon or silicon carbide fiber yarn portions and which has been densified by a pyrolysis process so that the space between the yarns is filled with a carbon or graphite or carbide material wherein the nozzle exhibits refractory characteristics, as disclosed in the aforesaid U.S. Pat. No. 4,519,290 to Inman et al. In this densification process, the preform is infiltrated with a suitable material such as, for example, pitch and subjected to a high temperature to carbonize the pitch, and this process is repeated until the structure has the desired density.

While a polar boss may have a straight yarn portion architecture as previously discussed, it need not usually require manufacture by such a densification process, but instead may be manufactured by allowing a suitable matrix material, which need not be actinic radiation curable if the yarn architecture can otherwise be suitably maintained, to cure about the yarn portions, as previously discussed.

In order to provide a nozzle or nozzle component or billet in accordance with the densification process in accordance with the present invention, after the yarn 76 impregnated with the matrix material 90 has been applied to the mandrel 70 and the yarn portions anchored by the at least partial curing of the matrix material 90, the article may be removed and subjected to a high temperature of perhaps 1000° Centigrade for perhaps an hour or more to reduce the matrix material 90 to a char, i.e., a carbon, carbide, or graphite substance. The article is then caused to undergo a number of densification cycles which may comprise the addition of pitch or other suitable material having a high char yield and the application of similar high temperature until the desired density is obtained, as discussed in the aforesaid Inman et al patent, to produce a carbon or carbide matrix, such as for example silicon carbide or hafnium carbide. Thus, "densification" is meant to include processes in which carbides as well as carbon or graphite are produced. For the purposes of this specification and the claims, the term "char yield" is meant to refer to the percentage of the remaining weight of a material such as matrix material 90 or a pitch after it has been subjected to a high temperature in an inert environment to a point beyond where the major chemical processes involved in decomposition of the material have occurred, i.e., a temperature of perhaps 1000° Centigrade for a sufficient time for the weight to stabilize. Since a higher char yield results in a greater weight of material remaining, a higher char yield may advantageously result in fewer cycles required for the desired densification. Since, in such a graphitization process, the matrix material is converted to char, the particular physical and performance characteristics thereof after curing would not be considered of importance. However, not only must the matrix material be at least partially curable to anchor the yarn 76 as it is wound onto the mandrel 70, but the matrix material 90 must also have an adequate char yield to hold the yarn portions in place prior to the first densification cycle after the matrix material has been converted to char. While it is believed that a 10 percent char yield will not achieve this result, a matrix material having a char yield of about 30 percent provides a charred material which is generally solid with continuity such that it may suitably hold the yarn portions in place before the first densification cycle.

A suitable ultraviolet radiation curable matrix material 90 providing a char yield of approximately 30 percent is based on a phenolic resin known as epoxy novolac. This resin has a high aromatic/aliphatic ratio responsible for the high char yield and also has a functional oxirane on each benzene ring to enable a densely cross-linked structure which cures rapidly with an ultraviolet radiation initiator. A suitable initiator may be, for example, a material distributed by Union Carbide Corporation under the name Cyracure UVI-6974 consisting of approximately 50 percent propylene carbonate and 50 percent triayrlsulfonium hexafluoroantimonate by weight. When mixed with 4 percent of such initiator, the resin will cure rapidly, that is, within seconds or minutes depending on the characteristics of the ultraviolet source. While matrix materials 90 with even higher char yields are generally more desirable, a smaller char yield such as the 30 percent yield provided by epoxy novolac may advantageously result in lesser interference with subsequent densification. After the matrix material 90 has been reduced to a char holding the yarn portions in place, the nozzle 30 may then be subjected to a series of densification cycles, as described in the Inman et al patent, to achieve a desired density, after which the nozzle may be machined as necessary to achieve the desired dimensions and finish of the final product. The mandrel 70 can be removed at any time after the structure has acquired sufficient strength to withstand the temperature and pressure of further processing.

A nozzle component billet, which is a right circular cylinder with constant inner and outer diameters, may be made in accordance with the densification process as discussed above after which the billet is suitably machined to form the nozzle component. The architecture may be two dimensional wherein all the yarns are either axial or essentially circumferential but without radial yarns, or three dimensional having two helicals in opposite directions and axial yarns, or any other suitable yarn architecture. The yarn architecture may be different in one region, such as one or both end portions, than in another region, such as the central portion, of the billet or nozzle component.

By curing at least partially the matrix material during rather than after lay-up, yarn architecture irregularities otherwise induced in initial layers of the composite by wrapping tension in later layers or by other debulk operations may also be advantageously minimized. The use of the actinic radiation curable matrix material 90 may also be useful in producing cross-section build-ups where desired by effectively anchoring the yarns thereof in place during the application.

It should be understood that while the invention has been described in detail herein, the invention can be embodied otherwise without departing from the principles thereof, and such other embodiments are meant to come within the scope of the present invention as defined by the appended claims.

What is claimed is:

1. A composite article comprising a tubular material having an axis, at least one ply of straight yarn portions of fibrous material, a matrix material impregnating said straight yarn portions, said at least one ply shaped to define a pair of circular end portions and an intermediate circular portion the diameter of which intermediate circular portion is less than the diameter of either of said circular end portions, and said straight yarn portions extending from one of said circular end portions to the other of said circular end portions.

2. An article according to claim 1 wherein at least a portion of said matrix material is characterized by being curable by actinic radiation.

3. An article according to claim 1 wherein at least a portion of said matrix material is characterized by being curable by ultraviolet radiation.

4. An article according to claim 1 wherein said straight yarn portions extend obliquely to an axial plane of the article, the article further including at least two plies of said straight yarn portions extending at respectively opposed angles relative to said axial plane and at least one ply of circumferentially extending yarn portions of matrix impregnated fibrous material.

5. An article according to claim 1 wherein said matrix material comprises carbonized material and said straight yarn portions are composed of carbon material.

6. A composite polar boss comprising a tubular material having an axis, at least one ply of straight yarn portions of fibrous material, a matrix material impregnating said straight yarn portions, said at least one ply shaped to define a pair of circular end portions and an intermediate circular portion the diameter of which intermediate circular portion is less than the diameter of either of said circular end portions, and said straight yarn portions extending from one of said circular end portions to the other of said circular end portions.

7. A polar boss according to claim 6 wherein at least a portion of said matrix material is characterized by being curable by actinic radiation.

8. A polar boss according to claim 6 wherein at least a portion of said matrix material is characterized by being curable by ultraviolet radiation.

9. A polar boss according to claim 6 wherein said straight yarn portions extend obliquely to an axial plane of the boss, the boss further including at least two plies of said straight yarn portions extending at respectively opposed angles relative to said axial plane and at least one ply of circumferentially extending yarn portions of matrix impregnated fibrous material.

10. A polar boss according to claim 6 wherein said boss has multiple plies and one ply of said straight yarn portions comprises at least one radially inner ply composed of higher compression strength material than the compression strength of the ply outwardly thereof and at least one radially outer ply is composed of higher tension strength material than the tension strength of the ply inwardly thereof.

11. A polar boss according to claim 6 wherein said at least one ply of straight yarn portions comprises at least one radially inner ply composed of epoxy impregnated boron material and at least one radially outer ply composed of epoxy impregnated graphite material.

12. A composite rocket motor nozzle component comprising a tubular article having an axis, at least one ply of straight yarn portions of fibrous material, a matrix material impregnating said yarn portions, said at least one ply shaped to define a pair of circular end portions and an intermediate circular portion, the diameter of said intermediate circular portion being less than the diameter of either of said circular end portions, and said straight yarn portions extending from one of said circular end portions to the other of said circular end portions.

13. A nozzle component according to claim 12 wherein at least a portion of said matrix material is characterized by being curable by actinic radiation.

14. A nozzle component according to claim 12 wherein at least a portion of said matrix material is characterized by being curable by ultraviolet radiation.

15. A nozzle component according to claim 12 wherein said straight yarn portions extend obliquely to an axial plane of the nozzle, the nozzle further including at least two plies of said straight yarn portions extending at respectively opposed angles relative to said axial plane and also further including at least one ply of circumferential yarn portions of matrix impregnated fibrous material.

16. A nozzle component according to claim 12 wherein said matrix material comprises carbonized material and said straight yarn portions are composed of carbon material.

* * * * *